July 5, 1932.  C. C. SMITH  1,866,508
MEAT HOLDING METHOD
Filed Aug. 16, 1929   2 Sheets-Sheet 1
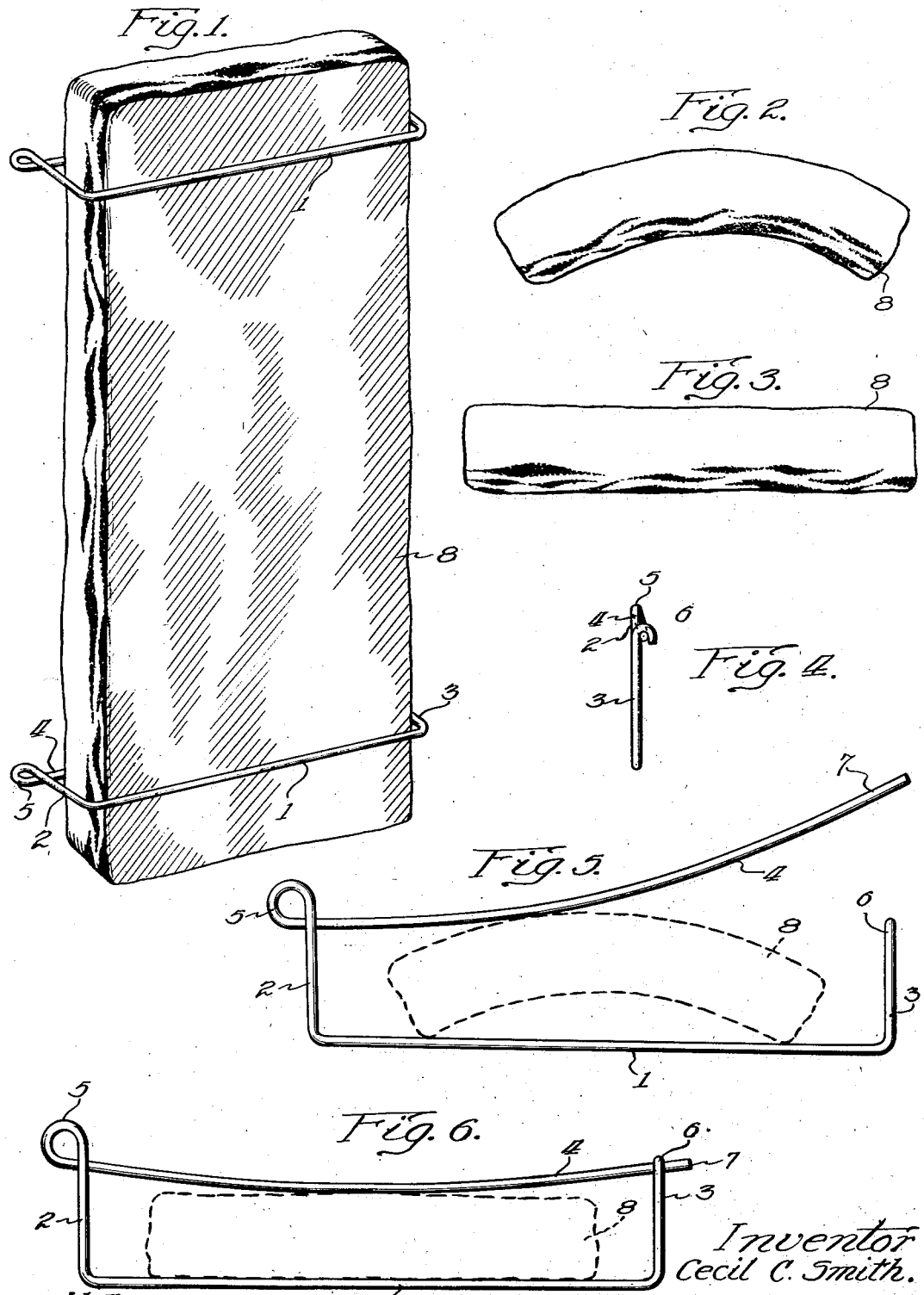

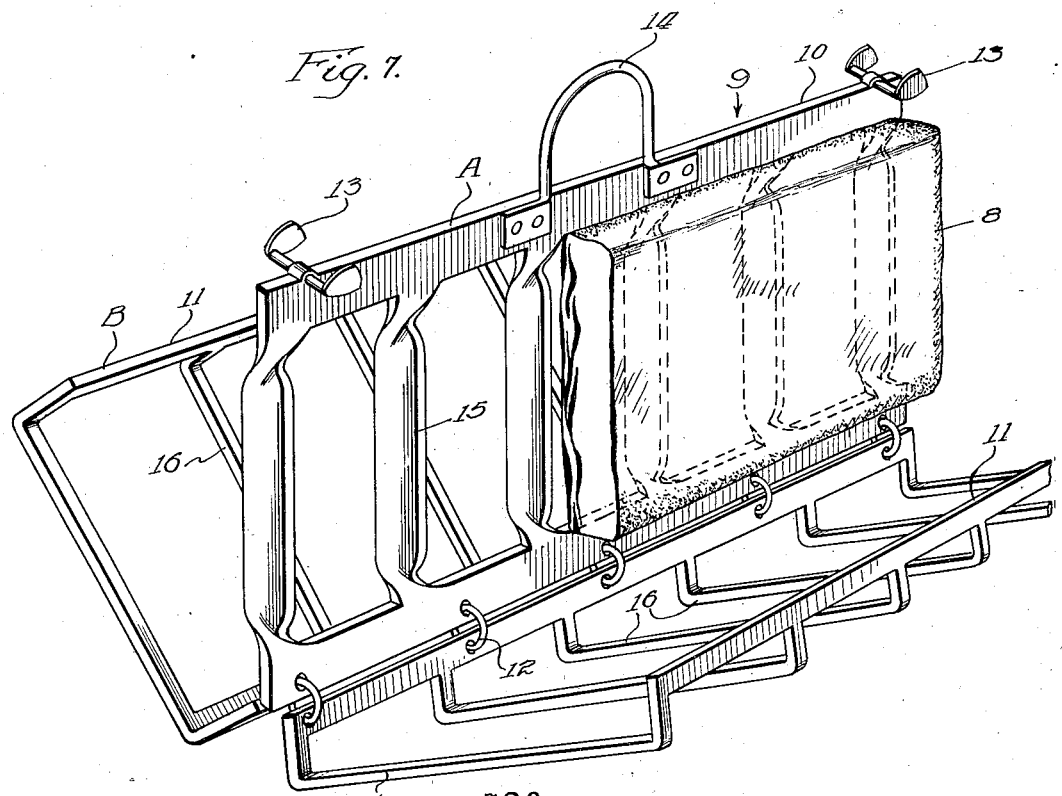
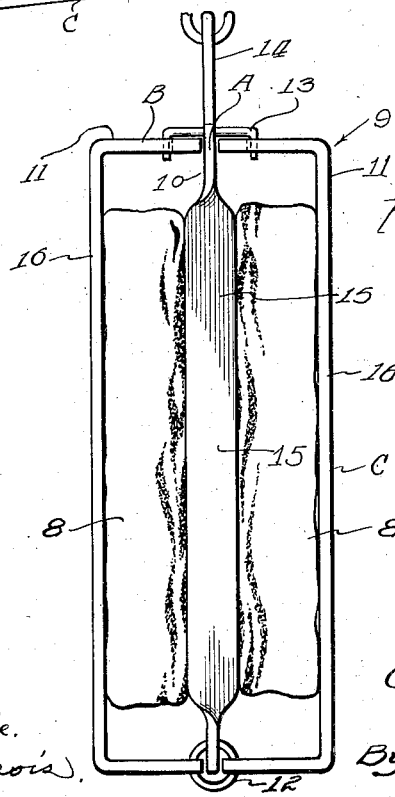

Patented July 5, 1932

1,866,508

UNITED STATES PATENT OFFICE

CECIL C. SMITH, OF CHICAGO, ILLINOIS, ASSIGNOR, BY MESNE ASSIGNMENTS, TO INDUSTRIAL PATENTS CORPORATION, OF CHICAGO, ILLINOIS, A CORPORATION OF DELAWARE

MEAT HOLDING METHOD

Application filed August 16, 1929. Serial No. 386,423.

This invention relates to the meat packing industry and especially to methods for the treatment of animal bellies or bacon. When bellies or slabs of bacon are smoked there is a tendency for the lean side to contract, especially when skinned bellies are used, causing the belly to warp or curl. As a result of such curling the appearance is less attractive, the slabs do not pack well, and moreover the bacon does not slice so well, especially in a machine, as when the slab lies flat.

While there is some advantage in holding the meat flat while being smoked, the most important consideration is to have it flat when ready for the market or for storage. Furthermore, holding it flat in the smoke house requires a much larger stock of restraining or flattening means than is necessary for mere subsequent straightening. It is best for market reasons also to minimize or avoid holder marks on the finished product.

The main objects of this invention are to provide a simple and effective method for straightening or flattening out meat and especially bellies or slabs of bacon after being smoked; to provide for holding such a slab flat while it is being sliced or until it has time to chill and become set in flat condition, so that it may be packed or exhibited in this form, and may lie flat freely in a slicing machine after such straightening; to provide for this with the least possible or no sign of holder marks; and to provide a method adapted to hold the bacon flat and without material interference with the smoking operation while it is being smoked and while being subsequently chilled.

An illustrative embodiment of this invention is shown in the accompanying drawings in which:—

Figure 1 is a perspective view of a slab of skinned bacon straightened out flat and so held by means of a plurality of clamps or holders.

Fig. 2 is an end view of a slab of bacon showing its natural curled shape as it comes from the smoke house, when no means have been used to hold it flat.

Fig. 3 is an end view illustrating how such a slab appears after being straightened out, and also the shape of a slab in the smoke house when the clamps are in place during the smoking.

Fig. 4 is an end view of a clamp such as those shown in Fig. 1, the view being as from the right end of Fig. 6.

Fig. 5 is a side elevation of a clamp with a slab of curled bacon in place, as shown by dotted lines, ready to be straightened out.

Fig. 6 is a somewhat similar view but with the clamp set and with the bacon held straight, as in Fig. 1.

Fig. 7 is a perspective view of a meat holder adapted for practicing the method of this invention, the holder being shown open.

Fig. 8 is an end view of the device of Fig. 7 in its closed position with the two slabs of bacon in place.

In the construction shown in the drawings, Figs. 1 to 6, the clamp or clip is made of No. 8 gauge tinned and tempered steel wire and somewhat resembles a large safety pin. I find that this clamp can be readily made by bending the wire over a form. The device comprises a straight back 1 with end pieces 2 and 3 at right-angles thereto, the swinging arm or pin part 4 being substantially an extension of one of the end members 2 with an outwardly turned spring loop 5 at the base of the pin part. The outer end and the other end member 3 is formed with a loop or segmental hook 6 to receive the free end 7 of the pin arm 4 when the clamp is set as illustrated in Figures 4 and 6.

In practicing this method on smoked meat the clamps are opened and slipped on over the ends of a belly or slab of bacon 8, with the back 1 which constitutes a straight form against the concave lean side and with the resilient bar 4 against the convex fat side to apply and maintain a constant holding pressure thereon. When the clamps are thus applied with the tip 7 held by the catch 6 the slab is thereby flattened out and so held until its sets in this form. The clamps are then removed and the bacon packed for storage or it may be sliced immediately. If desired the bacon may be sliced as soon as the clamps are applied.

When these clamps are used in the smoke house they are applied at once to the unsmoked bellies, the appearance being as in Figs. 1 and 6. Later, when the meat is removed from the smoke house the clamps are left on until the meat has been chilled and so set flat, ready for market, slicing or storage.

Holder 9, shown by Figures 7 and 8, is a double holder comprising a central frame 10 and a pair of outer frames 11 hinged at 12 to the lower edge of frame 10. When the outer frames 11 are closed against the middle frame 10, they are locked in place by fasteners 13 which may be in the form of hooks. The middle frame is provided centrally with an upward handle or loop 14 to facilitate handling and to permit hanging the holder in the smoke house or elsewhere. The part 10 comprises a rectangular frame having cross bars 15 disposed with their thin edges toward the bacon. In a somewhat similar manner, the outer frames 11 have cross bars 16 to bear against the outer sides of the bacon, side bars 16 preferably being resilient and normally curved inward somewhat centrally, so that when slabs of bacon are placed in the holder with the convex faces disposed outwardly the holder 9 will serve effectually to flatten the bacon and so hold it until it sets.

The slab of bacon when removed from the pickle bath, preparatory to smoking, assumes a substantially planar or flat position or form; and by reason of the high moisture content absorbed from the pickle bath tends, upon being subjected to smoking action, to curve, since the inner or fleshy side, having a considerable proportion of lean or nonfatty tissue, dehydrates from the action of the heat in the smoke house and shrinks on the outer surface. Bacon slabs treated by my method are mechanically prevented from so distorting since, after chilling, the meat sets, and no longer exhibits any substantial tendency to change its shape.

The results from following the method and using these clamps are that the meat packs better for storage and shipment; it looks neater and more attractive on sale; the belly lies more evenly on the table of the slicing machine, presenting less play while slicing than when badly warped or curved, and assuring more uniform slices. Another and most important result is that the slices from a straightened belly present a far better appearance than do those from bellies curved at varying degrees, especially in the visible packages now extensively used.

Although but two specific embodiments of holders are herein shown and described, it is to be understood that some of the details of the constructions shown and of the process described may be altered or omitted without departing from the spirit of the invention as defined by the following claim.

I claim:

The method of treating bellies which consists in forming the same into slabs, smoking the same whereby they naturally become curled along their main axes, and mechanically restoring the slabs to their original planar form by applying a straight form to the concave side of the slabs and maintaining a yieldable pressure against the convex sides of the said slabs, and then causing the slabs to become fixed in their orginal planar form.

Signed at Chicago this 10th day of August, 1929.

CECIL C. SMITH.